Oct. 15, 1968   R. M. NELDEN   3,405,524
LIQUID LEVEL SENSING AND CONTROL MEANS FOR FLUID DRIVES
Filed Feb. 13, 1967   2 Sheets-Sheet 2

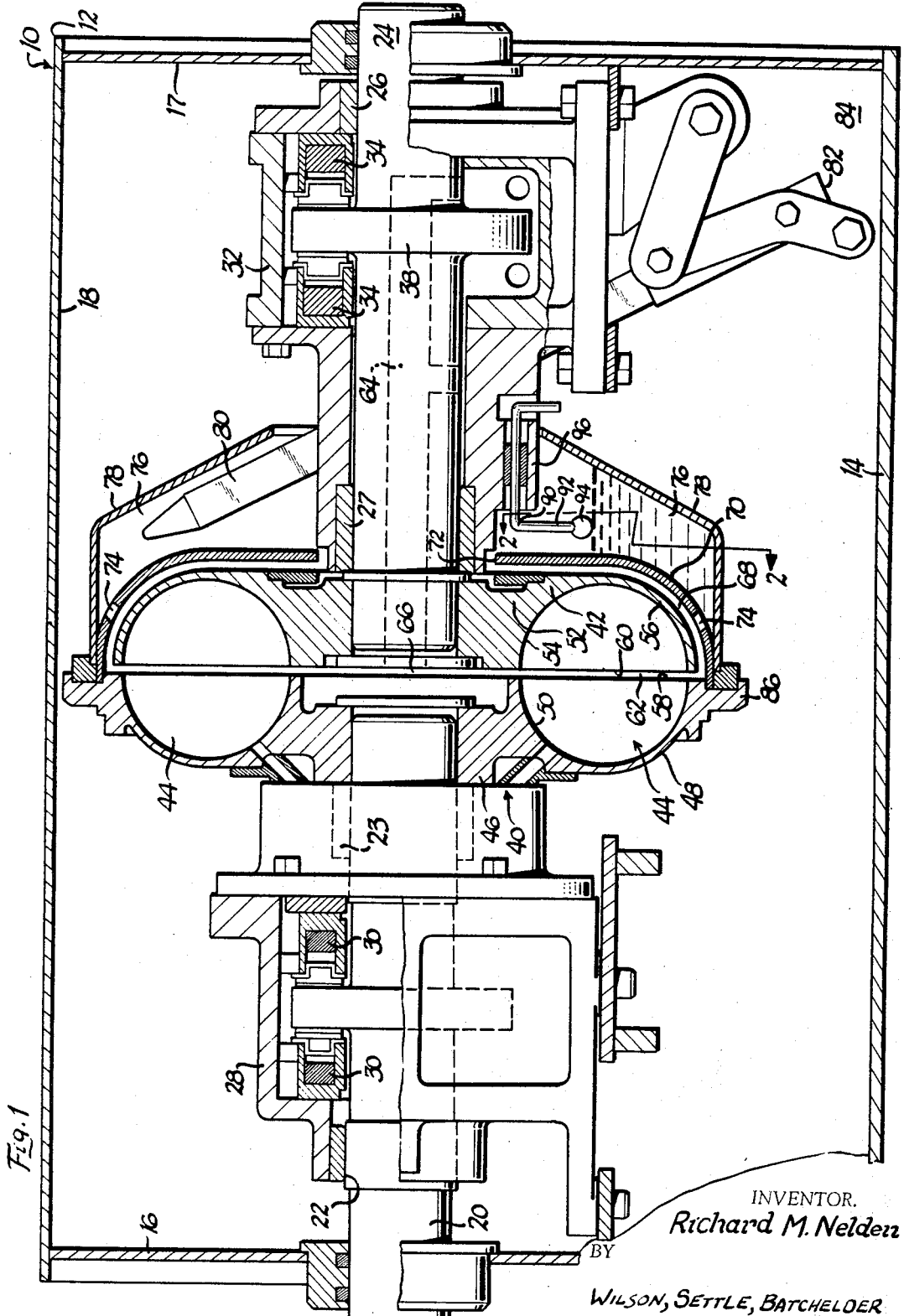

INVENTOR.
Richard M. Nelden
BY
WILSON, SETTLE, BATCHELDER
ATT'YS.   & CRAIG.

United States Patent Office 3,405,524
Patented Oct. 15, 1968

3,405,524
LIQUID LEVEL SENSING AND CONTROL MEANS
FOR FLUID DRIVES
Richard Marine Nelden, Southfield, Mich., assignor to
American Radiator & Standard Sanitary Corporation,
New York, N.Y., a corporation of Delaware
Filed Feb. 13, 1967, Ser. No. 615,450
11 Claims. (Cl. 60—54)

ABSTRACT OF THE DISCLOSURE

A fluid drive or fluid coupling is provided with a liquid level sensing device and a flow regulating valve to automatically regulate circuit oil flow to match heat load conditions. The fluid coupling is of the type wherein there is a work chamber defined by opposed impeller and runner shells and a control chamber in free liquid communication with the work chamber. The level of oil in the control chamber is varied to thereby vary the amount of oil in the work chamber. The amount of oil supplied from a cooler to the working circuit is varied to correspond with cooling needs, and this is accomplished by sensing the level of oil in the control chamber and opening or closing a valve in the oil supply circuit in response to the liquid level sensor to regulate the oil flow to match the heat load.

Background of the invention

In a fluid coupling, the oil which does work in the work chamber of the coupling must be cooled to keep the oil temperature at a reasonable working level. For cooling purposes a certain amount of oil is kept in circulation through the cooler, and conventionally, the amount of oil in circulation is kept constant at all times. The amount of oil in circulation is based on the cooling needs in the work chamber at maximum heat load conditions. Maximum heat load occurs at some reduced filling dependent upon slip and load conditions. On the other hand, at conditions such as operating at minimum slip, the heat load may be one-tenth (1/10) of the maximum heat load, so ten times as much oil is in circulation as is required. Since one of the major losses in a fluid coupling is the circulation loss, a considerable loss in efficiency can be expected.

Summary of the invention

In accordance with the invention, a considerable gain in efficiency can be obtained by regulating the oil flow to match the heat load. For this purpose, a liquid level sensing device is provided to sense the level of liquid in the control chamber of the coupling and thereby sense the liquid level in the working chamber. The amount of oil flowing in the circuit is regulated automatically by coupling the sensor element to a flow regulating valve connected to a supply conduit for supplying liquid to the working chamber. The linkage interconnecting the sensor and the valve is set to open the valve in response to a condition of reduced liquid level in the control chamber and therefore increased heat load in the work chamber, and to at least partially close the valve in response to a condition of increased liquid level in the control chamber and therefore reduced heat load in the work chamber. By monitoring liquid level in the coupling and regulating liquid flow in the manner just described, it is possible to insure adequate fluid circulation to handle the heat load and yet gain in overall efficiency because circuit losses are kept to a minimum. The valve is preferably a proportioning valve in which one passage is varied to control the flow of liquid to the work chamber and another passage, which bypasses the work chamber, is varied in the opposite sense.

Accordingly, it is an object of the invention to improve the efficiency of a fluid coupling by regulating the flow of liquid through a work circuit of the coupling to match heat load conditions therein.

Another object of the invention is to regulate circuit flow of liquid in a fluid coupling by monitoring the level of liquid in a control chamber of the coupling and controlling the circuit flow by operating a valve in the work circuit in response to the monitoring.

A further object of the invention is to monitor the level of liquid in a control chamber of a fluid coupling by means of a liquid level sensing device having a sensor element which stays at the surface of the liquid, and to regulate the flow of liquid in a work circuit of the coupling by means of a valve which is linked mechanically to the sensor element.

Other objects of this invention will appear in the following description and appended claims, reference being had to the accompanying drawings forming a part of this specification wherein like reference characters designate corresponding parts in the several views.

On the drawings:

FIGURE 1 is an elevational view, partly in section, of a fluid coupling provided with a monitoring and control system in accordance with the invention;

Figure 3:
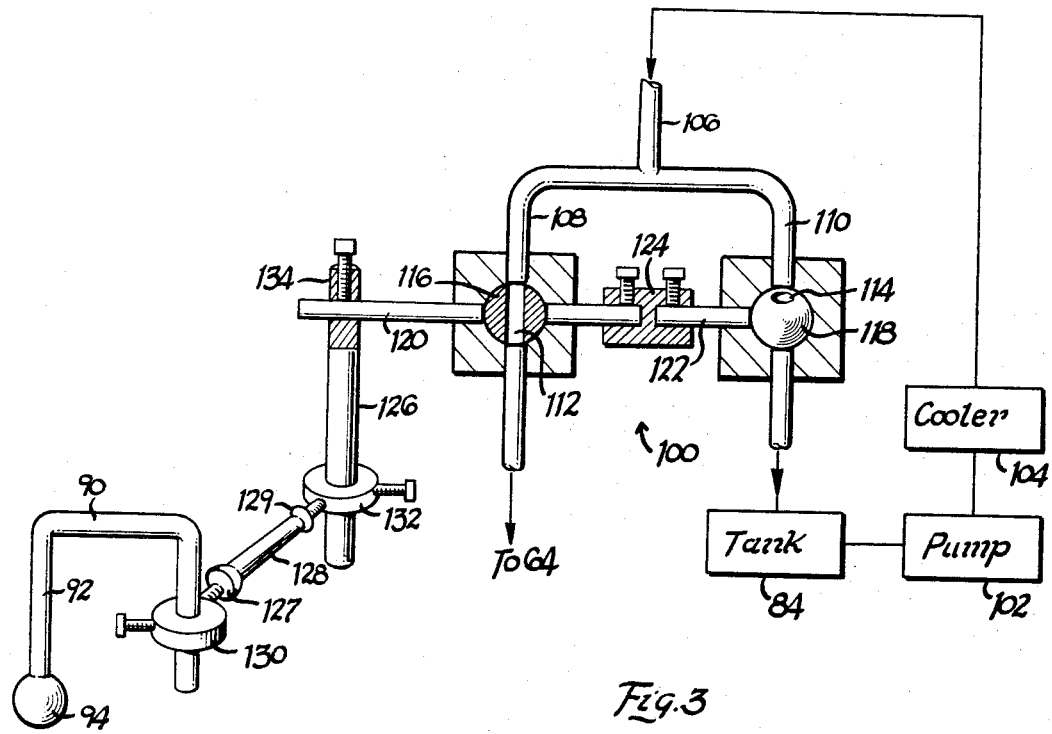
FIGURE 3 is a schematic diagram of a monitoring and control system for the fluid coupling of FIGURE 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

In FIGURE 1 is shown a fluid drive or fluid coupling 10 having a main housing 12 consisting of a base 14, two end walls 16 and 17, a top wall 18 and two side walls which are not visible in FIGURE 1. Extending through the end walls 16 and 17 are an input shaft 20 journaled in radial bearings 22, 23 and an output shaft 24 journaled in radial bearings 26, 27. Within a bearing pillow block 28 are thrust bearings 30 for the input shaft 20, and within bearing pillow block 32 are thrust bearings 34 for the output shaft 24. The shafts 20 and 24 have enlarged portions 36 and 38 respectively which run in the thrust bearings 30 and 34.

Fastened to the inner end of input shaft 20 is a vaned impeller 40, and fastened to the inner end of the output shaft 24 is a vaned runner 42. The impeller 40 and the runner 42 are directly opposed to each other and define a toroidal work chamber 44 between them. Impeller 40 has a hub portion 46 which is keyed or otherwise fastened to the input shaft 20 for rotation therewith. The impeller 40 also includes a semi-circular shell 48 which, together with the curved surface 50 of hub portion 46, forms one side of the work chamber 44. The runner 42 has a hub portion 52 which is keyed or otherwise fastened to the inner end of the output shaft 24 and which has a curved surface 54. The runner 42 also includes a semi-circular shell 56 which, together with the curved surface 54, defines the other half of the work chamber 44. The runner 42 rotates with the output shaft 24 independently of the input shaft 20.

Both the impeller 40 and the runner 42 have vanes 58 and 60 attached thereto, and these vanes are separated by a small gap 62. Liquid such as oil is provided in the work chamber 44, and it is this liquid which couples the impeller 40 and the runner 42 together as they are rotated. The input shaft 20 is rotated as by a motor to in turn rotate the impeller 40. This imparts a whirling motion to the liquid in the work chamber 44, and the whirling liquid causes the vaned runner 42 to rotate to in turn rotate output shaft 24.

Liquid enters the work chamber through a passage 64 which extends axially through the output shaft 24 and leads into the space 66 between the ends of the two shafts. From there the liquid flows radially into the work chamber 44. It may be noted that the liquid is free to flow from the work chamber into a space 68 between the shell 56 and the inner surface of a casing member 70. The casing member 70 conforms to the shape of the shell 56 and extends around the shell 56 to a terminal portion 72 near the base portion 52 of the runner. The casing member 70 is attached to the terminal end 86 of shell 48.

There are spaced ports 74 through the casing 70, and liquid can circulate through these ports 74 into a chamber which is known as a control chamber or scoop chamber 76. The ports 74 are spaced about the circumference of casing 70. The scoop chamber 76 is defined by the casing 70 and a shell member 78 which, together with casing 70, is attached to the terminal end 86 of the shell portion 48 of impeller 40. Thus, both the shell member 78 and the casing member 70 rotate with the impeller 40. It may be noted that the scoop chamber 76 is in free liquid communication with the work chamber 44, and that the level of liquid in these two chambers will be approximately the same, although not necessarily identical. The scoop chamber 76 is axially aligned with the work chamber 44. It may be noted that the fluid coupling is shown in an at rest condition in which the liquid accumulates at the bottom of the scoop chamber 76. When the impeller and runner are rotating, the liquid level will be uniformly distributed throughout the scoop chamber and the work chamber.

The level of the rotating liquid in the scoop chamber 76 is controlled by a scoop tube 80 which projects into the scoop chamber and dips into the liquid therein. The liquid flows through the scoop tube 80 and discharges at its bottom end 82 into a sump or reservoir 84 at the bottom of the housing 12. The level of liquid in the scoop chamber 76 and also the amount of liquid in the working chamber 44 depends on how far the scoop tube 80 projects into the scoop chamber 76. The scoop tube 80 can be radially adjusted to change its position in the scoop chamber 76, and this adjustment may be made manually.

It may be noted that the amount of liquid in the scoop chamber 76 and in the work chamber 44 determines the degree of slip existing between the runner and the impeller. Thus, with a relatively great amount of fluid in the work chamber there is little slip between the runner and the impeller, and with a relatively small quantity of fluid in the work chamber there is more slip between the impeller and the runner, assuming constant impeller speed and load.

When operating in conditions of maximum slip, there is a relatively great tendency for the liquid to heat up, and consequently there is a need for cooling the liquid in the work chamber. In minimum slip conditions, there is some tendency to heat up the liquid but not as much as in maximum slip conditions. The heat generated is also a function of the loading of the unit. It has been found that the maximum heat load in the work chamber occurs at a liquid level somewhat above the minimum level (which represents the declutched condition of the coupling) but well below the maximum level (which represents the fully clutched condition of the coupling). Cooling is accomplished by circulating liquid from the reservoir or tank 84 through a cooler and into through the work chamber 44. Passage 64, work chamber 44, scoop chamber 76 and scoop tube 80 constitute a working circuit through which oil is circulated. In a conventional fluid coupling a constant oil circulation to the work chamber regardless of load or speed conditions is provided, and the circulation is based on the maximum heat load. There is no need to circulate as much liquid when operating in conditions of lesser slip or lesser load, and consequently a considerable gain in efficiency can be obtained by regulating the flow to match the heat load.

In order to regulate the circulating liquid to match heat load conditions, it is desirable to sense the level of liquid in the scoop chamber 76 in order to provide an indication of the level of liquid in the work chamber 44 and also the heat load therein. The liquid level in the scoop chamber 76 is sensed by a sensor element 90 which includes an arm 92 projecting into the scoop chamber 76 having a ball 94 on its end which contacts the surface of liquid in the scoop chamber and may float thereon. The sensing element 90 is supported by a bearing 96 which allows pivotal movement of the arm 92 in the scoop chamber.

Figure 2:
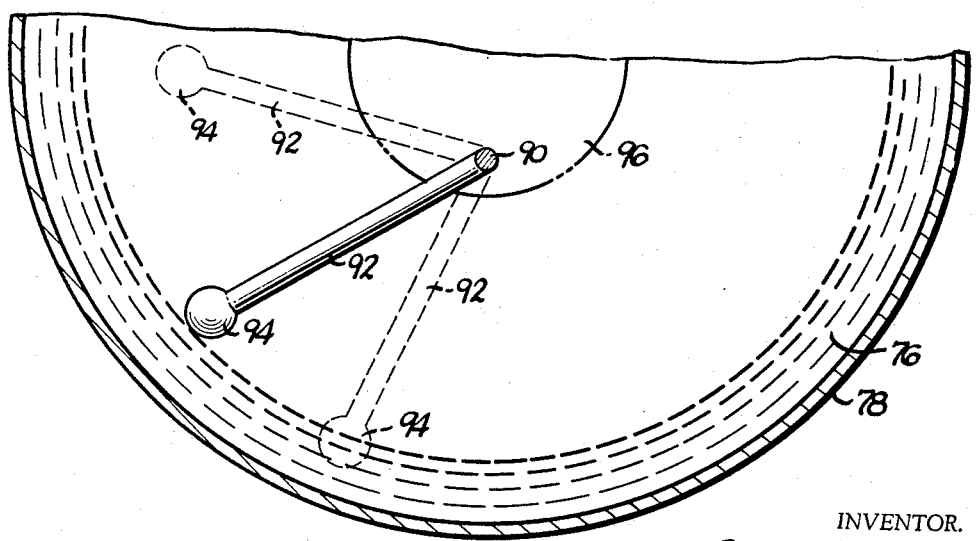
FIGURE 2 is a fragmentary sectional view taken along line 2—2 in FIGURE 1.

Three positions of the arm 92 are shown in FIGURE 2. When the liquid level in the scoop chamber is at a minimum, the arm 92 is in the dotted line position at the right in FIGURE 2 and extends downward at a slight angle to a vertical position. This position of the arm is known as the full declutch position. When the level of liquid in the scoop chamber rises to a maximum level, the arm 92 pivots to its dashed line position to the left in FIGURE 2 wherein the arm extends at a slight angle to a horizontal position. This is the fully clutched position. The solid line position of arm 92 is an intermediate location at which the heat load of the working liquid is at a maximum. The movement of the arm 92, to the various positions, provides a signal which is an indication of the liquid level in the scoop chamber and the work chamber, and the latter signal can be utilized to regulate the flow of liquid in the working circuit.

FIGURE 3 is a schematic diagram of a monitoring and control system for regulating the circuit flow of liquid to match heat load conditions. The system includes the liquid level sensor element 90 which has been previously described, and also includes a proportioning valve 100 which regulates circuit flow. Liquid is supplied from the tank or reservoir 84, which may be within the housing 12 as previously mentioned, and liquid is pumped from this tank by a pump 102 through a cooler 104 where the liquid is cooled to the desired temperature. The liquid flows from the cooler 104 through a supply conduit 106 which divides into two branches 108 and 110. The proportioning valve 100 likewise has two passages 112 and 114. The passage 112 controlling oil flow from the branch conduit 108 and the passage 114 controlling oil flow from the branch conduit 110. The passages 112 and 114 are provided in spools 116 and 118. The spools 116 and 118 are mounted for rotation on shafts 120 and 122 which are interconnected by a clamp 124. Thus, the relative positions of the spools 112 and 114 may be set before tightening the clamp 124. Shaft 120 is coupled to the sensing element 90 by two arms 126 and 128 interconnected as shown, arm 128 being connected to sensing element 90 by a clamp 130 and connected to arm 126 by a clamp 132 at the other end of arm 128. Arm 126 is connected to shaft 120 by a clamp 134. The arm 128 may be provided with ball and socket joints 127 and 129.

The sensing element 90 is shown in FIGURE 3 in a partially declutched position in which the level of liquid in the scoop chamber and also in the work chamber of the fluid coupling is at a relatively low level. This is representative of the maximum heat load condition. In this position of the sensing element, passage 112 of spool 116 is fully aligned with the supply conduit 108 to allow full flow of cooled liquid through passage 112 and from there to the passage 64 which extends through the output shaft 24 and ultimately leads to the work chamber 44. The passage 114 in spool 118 is out of alignment with conduit 110, and consequently no fluid is bypassed around the work chamber.

It may be seen that if the level of the liquid in the scoop chamber 76 rises, the sensing element will pivot in a clockwise direction as viewed in FIGURE 2, and this will cause the spools 116 and 118 to turn such that passage 112 will become partially closed and passage 114 will become partially opened. In this condition, some fluid would flow through passage 112 to the working circuit, but also some liquid would be bypassed around the work chamber through passage 114. The latter liquid merely flows back to the tank 84. The same result will occur if the liquid level falls.

If liquid fills up the scoop chamber so that the arm 92 pivots to its full clutched position as shown in dashed lines in FIGURE 2, the spools 116 and 118 will turn further until the passage 114 is fully aligned with the supply conduit 110 to provide a major flow of liquid bypassing the work chamber. Passage 112 in spool 116 will still be partially aligned with the supply conduit 108, but only a relatively small amount of liquid flows through the passage 112 to the working circuit including the passage 64 and the work chamber 44. A similar result occurs when the arm 92 pivots to the full declutched position as shown in dashed lines in FIGURE 2.

Thus, the cooling needs of the work chamber are sensed by monitoring the liquid level in the scoop chamber with a liquid level sensing device, and a valve is controlled by the liquid level sensing device to regulate the amount of oil flowing in the work circuit. The flow in the work circuit is matched to the heat load so that there is a maximum flow in the work circuit when the fluid coupling is operating at maximum slip conditions, and there is a minimum flow of liquid in the work circuit when the fluid coupling is operating at minimum slip conditions. Consequently, a substantial gain in efficiency is obtained.

It may be noted that the liquid level sensing device may be utilized to operate a control device other than a valve. For instance, the liquid level sensing device might be connected to a pump such as pump 102 to control the amount of liquid pumped through the working circuit. Where a valve is used, it may be provided at a location remote from the fluid coupling with an intermediate control device provided to operate the valve in response to the liquid level sensing device. Thus, some alternatives are available.

I claim:

1. In a fluid coupling having opposed impeller and runner shells defining a work chamber, a control chamber in free liquid communication with said work chamber, supply means including a conduit connected to supply cooled liquid to said work chamber, and adjustable means in said control chamber for varying the level of liquid in said control chamber and thereby varying the amount of liquid in said work chamber, the improvement of a liquid level sensing device having a sensor member at the surface of liquid in said control chamber and movable to stay at said surface as the liquid level in said control chamber varies, a valve having a passage connected to said supply conduit for controlling the flow of cooled liquid to said work chamber, and a mechanical linkage coupling said sensor member to said valve for relatively opening said valve passage in response to a condition of a liquid level in said control chamber which corresponds to an increased heat load in said work chamber, and for at least partially closing said valve passage in response to a condition of a liquid level in said control chamber which corresponds to a decreased heat load in said work chamber.

2. A fluid coupling as claimed in claim 1 in which said sensor member comprises a pivotally mounted arm in contact with the surface of liquid in said control chamber.

3. A fluid coupling as claimed in claim 2 in which said arm floats at the surface of liquid in said control chamber.

4. In a fluid coupling having opposing impeller and runner shells defining a toroidal work chamber, a control chamber in free liquid communication with said work chamber, supply means including a conduit connected to a supply cooled liquid to said work chamber, and scoop means in said control chamber adjustable to vary the level of liquid in said control chamber and thereby vary the amount of liquid in said work chamber, the improvement of a liquid level sensing device having a sensor element in said control chamber operative to monitor the level of liquid therein and provide a signal indicative of said liquid level, and a proportioning valve responsive to said signal and having a first passage connected to said supply conduit and a second passage bypassing said work chamber, said liquid level sensing device relatively opening said first passage and closing said second passage in response to a condition of a liquid level in said control chamber which corresponds to an increased heat load in said work chamber, and said liquid level sensing device progressively closing said first passage and opening said second passage in response to a liquid level in said control chamber which corresponds to a decreased heat load in said work chamber.

5. In a fluid coupling having opposed impeller and runner shells defining a work chamber, a control chamber in free liquid communication with said work chamber, supply means including a conduit connected to supply cooled liquid to said work chamber, and adjustable means in said control chamber for varying the level of liquid in said control chamber and thereby varying the amount of liquid in said work chamber, the improvement of a liquid level sensing device having a sensor member at the surface of liquid in said control chamber and movable to stay at said surface as the liquid level in said control chamber varies, a proportioning valve having a first passage connected to said conduit for controlling the flow of liquid to said work chamber and second passage connected to said supply means and bypassing said work chamber, said first and second passages having control members therein for opening and closing said passages, and a mechanical linkage coupling said sensor member to said control members for relatively opening said first passage and closing said second passage in response to a condition of a liquid level in said control chamber which corresponds to an increased heat load in said work chamber, and for at least partially closing said first passage and at least partially opening said second passage in response to a condition of a liquid level in said control chamber which corresponds to a decreased heat load in said work chamber.

6. In a fluid coupling,
a toroidal work chamber defined by opposing impeller and runner shells,
supply means including a conduit connected to supply cooled liquid to said work chamber,
a control chamber in axial alignment and free liquid communication with said work chamber,
means in said control chamber adjustable to vary the level of liquid in said control chamber and thereby vary the amount of liquid in said work chamber,
means for monitoring the level of liquid in said control chamber and providing a mechanical signal indicative of said liquid level,
and a proportioning valve controlled by said monitoring means and having a first passage connected to said supply conduit and a second passage bypassing said work chamber,
said monitoring means relatively opening said first passage and closing said second passage of said valve in response to a liquid level which corresponds to an increase in the heat load in said control chamber and said work chamber,
and said monitoring means progressively closing said first passage and opening said second passage of said valve in response to a liquid level corresponding to a decrease in the heat load in said control chamber and said work chamber.

7. A fluid coupling as claimed in claim 6 in which said monitoring means includes a liquid level sensing element in said control chamber movable by a change in the liquid level in said control chamber to provide said mechanical signal.

8. A fluid coupling as claimed in claim 7 in which said liquid level sensing element comprises a pivotally mounted arm in contact with the surface of liquid in said control chamber.

9. The fluid coupling as claimed in claim 8 in which said arm floats at the surface of said liquid and stays at that surface as the level of liquid changes in said control chamber.

10. The fluid coupling as claimed in claim 9 in which said monitoring means includes a mechanical linkage coupling said movable arm to said proportioning valve and operative to translate movement of said arm into opening and closing adjustment of said first and second passages in said valve.

11. In a fluid coupling having opposed impeller and runner shells defining a work chamber, a control chamber in free liquid communication with said work chamber, supply means connected to supply cooled liquid to said work chamber, and means in said control chamber for varying the level of liquid in said control chamber and thereby varying the amount of liquid in said work chamber, the improvement of a liquid level sensing device having a sensor member at the surface of liquid in said control chamber and movable to stay at said surface as the liquid level in said control chamber varies, control means for controlling the flow of cooled liquid to said work chamber, and means coupling said liquid level sensing device to said control means for causing said control means to supply a maximum flow of cooled liquid to said control chamber in response to a condition of a liquid level in said control chamber as sensed by said sensing device corresponding to an increased heat load in said work chamber, and to supply a minimum flow of cooled liquid to said control chamber in response to a condition of a liquid level in said control chamber as sensed by said sensing device corresponding to a decreased heat load in said work chamber.

No references cited.

EDGAR W. GEOGHEGAN, *Primary Examiner.*